(12) United States Patent
Kibol et al.

(10) Patent No.: US 8,414,807 B2
(45) Date of Patent: Apr. 9, 2013

(54) METHOD FOR PRODUCING HIGH SILICATE FIBRES

(76) Inventors: Viktor F. Kibol, Kiev (UA); Roman V. Kibol, Kiev (UA); Iryna V. Kibol, Kiev (UA)

(*) Notice: Subject to any disclaimer, the term of this patent is extended or adjusted under 35 U.S.C. 154(b) by 0 days.

(21) Appl. No.: 12/602,886

(22) PCT Filed: Jun. 5, 2007

(86) PCT No.: PCT/UA2007/000037
§ 371 (c)(1), (2), (4) Date: Dec. 3, 2009

(87) PCT Pub. No.: WO2008/150248
PCT Pub. Date: Dec. 11, 2008

(65) Prior Publication Data
US 2010/0173151 A1  Jul. 8, 2010

(51) Int. Cl.
*C03B 37/07* (2006.01)
*C03B 37/08* (2006.01)
*D01D 5/08* (2006.01)
*D01F 9/08* (2006.01)

(52) U.S. Cl. .............. 264/101; 264/102; 264/211.11

(58) Field of Classification Search .......... 264/101, 264/102, 211.11
See application file for complete search history.

(56) References Cited

U.S. PATENT DOCUMENTS

| 6,647,747 | B1 | 11/2003 | Brik | |
|---|---|---|---|---|
| 7,632,442 | B2 * | 12/2009 | Beuzieron | 264/211.11 X |
| 2002/0069678 | A1 * | 6/2002 | Aslanova | 65/475 |

FOREIGN PATENT DOCUMENTS

| RU | 2118300 C1 | 8/1998 |
|---|---|---|
| RU | 2254300 C2 | 6/2005 |
| SU | 582213 A * | 2/1978 |
| SU | 1092905 A | 1/1986 |
| WO | 2005009911 A2 | 2/2005 |

* cited by examiner

*Primary Examiner* — Leo B Tentoni
(74) *Attorney, Agent, or Firm* — DeLio & Peterson, LLC; Peter W. Peterson

(57) ABSTRACT

The invention relates to a method for producing continuous chopped, coarse, staple inorganic fibers from such natural minerals and rocks as sand, quartz, reduced quartz sand stone and quartzite. The inventive method consists in melting silicon-based stone, which is used in the form of a raw material, at a temperature of 1750-1850° C., the melt being homogenated and stabilized at said temperature, in forming a decompression zone on the path of the melt flow to the discharge orifice die, in which the melt flow is shaped in the form of a strip with a thickness of 3-20 mm, and in passing said strip through the decompression zone at a speed $V=(7 \ldots 9)10^{-4}$ m/s. The air pressure in the decompression zone above the melt flow is maintained within a range of 0.10-0.30 Pa. The inventive device comprises a furnace for producing melt, a feeder, at the output of which a transfer chamber is mounted, a discharge orifice, a stream feeder assembly and a fiber producing mechanism. A homogenizer in the form of two cylinders, which are vertically and coaxially arranged with a gap one inside the other, is situated between the furnace and the feeder. A vertical baffle for producing a melt flow in the form of a strip is placed in the external cylinder. A clarifying chamber is provided with a unit for forming vacuum in the cavity thereof. Said invention makes it possible to increase the strength and chemical resistance of produced fibers by providing conditions for reducing the number of foreign, in particular, gaseous inclusions.

4 Claims, 1 Drawing Sheet

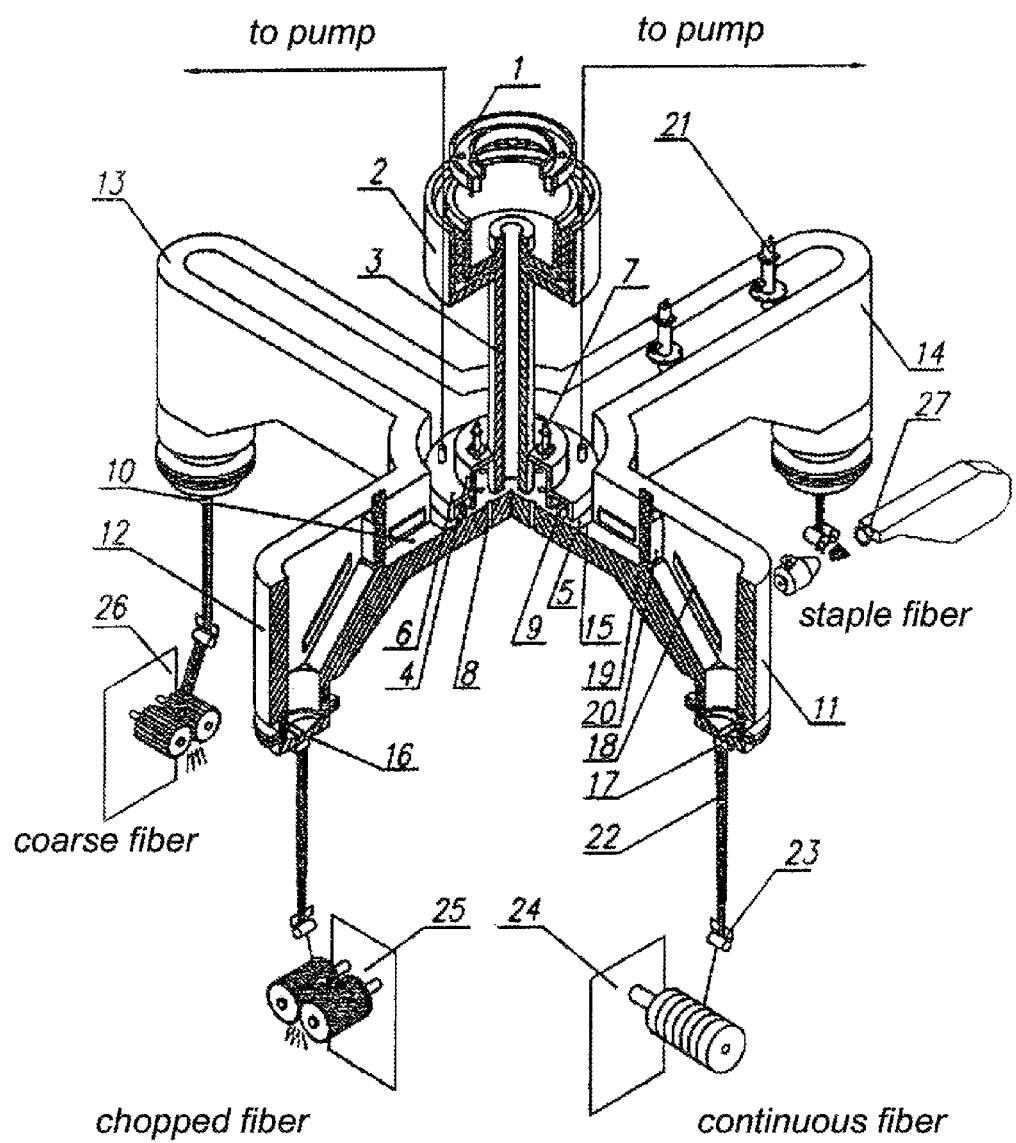

METHOD FOR PRODUCING HIGH SILICATE FIBRES

The present invention relates to a method of production of continuous, chopped, coarse, and staple inorganic fibers of natural rock minerals, such as sand, quartz, reduced quartz sandstone, and quartzite, as well as products manufactured of such fibers in the suggested process, namely high silicate continuous fibers, high silicate chopped fibers, high silicate coarse fibers, and high silicate staple fibers.

Application of inorganic fibers of natural materials, such as sand, enables the manufacture of environmentally sound, weatherproof materials, replacing in many cases asbestos, glass, metal, wood and other industrial materials. Thus, demand and technical requirements for such materials are increasing. In particular, it is to emphasize the application of sand fibers as a reinforcing material in construction to replace glass fiber in manufacture of, for instance, glass-fiber reinforced concrete.

A method of producing continuous fibers of rocks is known comprising the operations of rock fragmentation, melting in a melting furnace and drawing of continuous fibers from the melt through a bushing /RF Patent 2102342, IPC6 C03B 37/00, publication date 20 Jan. 1998/. In the described method the rocks used are basalt group rocks, from basic to medium in contents, and the temperature in the furnace is within the range of 1500 to 1600° C.

Fibers produced with the use of this method have insufficient tensile strength due to presence of foreign inclusions.

The most similar to the proposed method in terms of a number of essential features is a method of high silicate fiber production of rocks comprising the operations of charging rocks into a melting furnace, melting, melt homogenization and stabilization, and drawing of fibers from the melt through a bushing /RF Patent 02118300, IPC6 C03 B 37/02, publication year 1998/.

A drawback of the described method is insufficient strength and chemical stability of continuous fibers manufactured in the described process due to foreign, in particular gaseous, inclusions.

The most similar to the suggested device in terms of a number of essential features is that for the production of high silicate fibers of rocks comprising a melting furnace, whose output is connected to the feeder input, followed by a transfer chamber equipped with a discharge orifice with a bushing assembly in its wall, and a fiber-forming mechanism. /RF Patent 62924 UI, IPC 6 C03 B 37/02, publication date 5 Oct. 2007/.

A drawback of the described device is insufficient strength and chemical stability of continuous fibers manufactured in the described process due to foreign, in particular gaseous, inclusions.

Continuous fibers are known that are produced by a method described in RF Patent 2233810/IPC 6 C 03 B 37/06, publication date 8 Oct. 2004/.

A drawback of the described fibers is their insufficient strength and chemical stability due to foreign inclusions.

High silicate chopped fibers are known that are produced by a method described in "Continuous Chopped Fibers" /M. G. Chernyaka. —M.: Chemistry—1965. —320; pp. 214-215/.

A drawback of the fibers is their insufficient strength and chemical stability due to foreign inclusions.

Basalt chopped fibers are known that are produced by melt stream pulling, with subsequent chopping into 70 ... 100 mm lengths as described in "Composite Materials Based on Basalt Fibers"/UDC 666.19., Scientific Paper Coll./Academy of Sciences of UkSSR. Institute of Materials Science of I. N. Fratsevich; editorial staff: Sergeev V. P. et al. —Kiev, 1989. —165 pp.; pp. 9-14/.

A drawback of the fibers is their insufficient strength and chemical stability due to foreign inclusions.

High silicate staple fibers are known that are produced by a method described in RF Patent 2233810/IPC 6 C 03 B 37/06, published 8 Oct. 2004/.

A drawback of the fibers is their insufficient strength and chemical stability due to foreign inclusions.

The present invention aims at proposing a method and device for producing high silicate fibers of rocks enabling significant increase in strength and chemical stability of manufactured fibers by creating suitable conditions for decrease in impurities and gaseous inclusions.

The objective is attained by the choice of rock whose melt has the temperature at which the major portion of foreign inclusions dissolve or burn down, and the resulting bubbles of gas are removed from the melt in the decompression zone on the path of the melt flow to the discharge orifice bushing.

Similar to the known one, the suggested method of producing high silicate fibers of rocks comprise the operations of rock charging into a melting furnace, melting, melt homogenization and stabilization, fiber formation from the melt coming out of the discharge orifice bushing. The inventive method consists in melting silicon-based rock that is used as a raw material. Upon melt formation from the same, the temperature is brought to 1750 ... 1850° C. Upon melt homogenization and stabilization the decompression zone is formed on the path of the melt flow to the discharge orifice bushing at the specified temperature. In it the melt flow is shaped into a strip 3.0 ... 20.0 mm thick and passed through the zone with the rate of $V=(7...9)10^{-4}$ m/s. The air pressure in the decompression zone above the melt flow is maintained within a range of 0.10 ... 0.30 Pa.

A distinctive feature of the method also consists in that sand is used as a raw material.

A distinctive feature of the method also consists in that quartz sand is used as a raw material.

A distinctive feature of the method also consists in that reduces quartz sandstone or quartzite is used as a raw material.

Similar to the known one, the suggested device for the production of high silicate fibers of rocks by the above method comprises a melting furnace, whose output is connected to the feeder input, followed by a transfer chamber equipped with a discharge orifice with a bushing assembly in its wall, and a fiber-forming mechanism. The inventive installation consists in that a homogenizer in the form of two cylinders, which are vertically and coaxially arranged with a gap one inside the other, is situated between the furnace and the feeder. The cylinders form the inner—inlet chamber, and the outer—refining chamber. A vertical baffle that is intended for forming a strip of a melt flow on its upper end is mounted in the latter. The refining chamber is equipped with a unit for vacuum formation in the cavity thereof. There is a gap for the melt flow between the bottom of one cylinder and free end of the other.

A distinctive feature of the suggested device consists in that the vertical baffle in the refining chamber of a homogenizer is height-adjustable.

A distinctive feature of the suggested device consists in that the homogenizer is equipped with a heating system in the form of at least two rows of air-gas burners attached at an off-vertical angle of $\alpha=3...65°$ and staggered radially at a distance $H=(5...7)D$ off the vertical axis of the homogenizer, where D is a diameter of a burner nozzle designed for directing flame to the inner—inlet chamber of the homogenizer.

A distinctive feature of the suggested device also consists in that the homogenizer is equipped with devices for side and bottom bubbling.

A distinctive feature of the suggested device also consists in that the entrance to the homogenizer is located below the furnace bottom.

Similar to the known ones, the suggested high silicate continuous fibers are produced of rocks. The invention consists in that they are manufactured of silicon-based rocks by the above method.

Similar to the known ones, the suggested high silicate chopped fibers are produced of rocks. The invention consists in that they are manufactured of silicon-based rocks by the above method.

Similar to the known ones, the suggested high silicate coarse fibers are produced of rocks. The invention consists in that they are manufactured of silicon-based rocks by the above method.

Similar to the known ones, the suggested high silicate staple fibers are produced of rocks. The invention consists in that they are manufactured of silicon-based rocks by the above method.

The authors have experimentally determined the types of rock and optimum operating conditions for implementation of the methods of producing high silicate inorganic continuous, chopped, coarse and staple fibers. Silicon-based rocks prove to be such a material. In particular, they include sand, quartz sandstone, and quartzite /Technical Encyclopedia.—M.: JSC "Sovetskaya Entsiklopedia".—V. 11, pp. 581-583.—1930/. The suggested inventions provide for the application of silicon-based rock as a raw material, with silicon oxide content equal to or exceeding 52%. This is due to the fact that the increase in silicon oxide content in raw materials raises the rock melting point, which subsequently enables the removal of the major portion of solid foreign inclusions—detrimental impurities—in the melting process.

At the silicon-based rock melting temperature below 1750° C. most foreign inclusion are not removed from the melt, which results in a non-amorphous melt. At the same time, the temperature above 1850° C. has no effect on the product quality, and thus it is not economically viable. Furthermore, at the temperature above 1850° C. there have been incidents of boiling of melt portions resulting in new gaseous micro seed formations. A melt flow in the form of a strip is more technologically effective than, for instance, that in the form of a cylindrical flow. Moreover, the form of a strip in particular allows decreasing through-thickness thermal gradient making it uniform. The strip thickness depends on the melt viscosity and flow rate. The thicker the strip and the higher the rate, the higher the quality of processed fibers as this enables removal of more bubbles of gas in the decompression zone. The authors have experimentally determined the optimum values of a melt strip thickness to be $3.0 \ldots 20.0$ mm and flow rate to be $V=(7 \ldots 9)10^{-4}$ m/s. Thus, for thickness below 3.0 mm and flow rate above $V=9\cdot 10^{-4}$ m/s melt heating and flow rate increasing are associated with additional energy cost, which is not considered economically viable. If the thickness of a melt of silicon-based rock is above 20.0 mm and its flow rate is below $7\cdot 10^{-4}$ m/s it is impossible to remove the number of bubbles and foreign inclusions in order to significantly improve the quality of processed fibers. The air pressure in the decompression zone above the melt is maintained within the range of $0.10 \ldots 0.30$ Pa as such a decompression level in the $3.0 \ldots 20.0$ mm melt strip forming zone appears to be sufficient for removal of the major portion of bubbles and foreign inclusions from the melt. A higher level of decompression is not considered economically viable. The homogenizer is equipped with a heating system whose parameters have been determined experimentally. Taking into account the limited space, the system is formed by two rows of air-gas burners attached at an off-vertical angle of $\alpha=3 \ldots 65°$ and staggered radially at a distance of $H=(5 \ldots 7)D$ off the vertical axis of the homogenizer, where D is a diameter of a burner nozzle designed for directing flame to the inner—inlet chamber of the homogenizer. The design guarantees uniform heating of the same.

The essence of the invention is further explained by a drawing of the suggested device.

The device for production of high silicate fibers of rocks "Kibol—S Module" (FIG. 1) consists of a batch charger 1, connected to the reservoir of an electric resistance furnace 2, intended for melting. The furnace exit 2 is connected by means of a heat-resistant drain unit 3 to the entrance of the inlet chamber 4 of a homogenizer 5. The homogenizer 5 consists of the inlet chamber 4 and refining chamber 6. The inlet chamber is equipped with the heating system in the form of air-gas burners 7, attached in the homogenizer 5 at an off-vertical angle of $\alpha=45°$ and staggered in two rows at a distance of $H=6D$ from the axis of the same 5, where D is a burner 7 diameter. The burners 7 are intended for formation and direction of flame to the inlet chamber 4 of the homogenizer 5. The installation is equipped with a bubbling system comprising bubbling nozzles 8 intended for heated air supply to boost the stirring of a melt in order to achieve uniformity in chemical composition and temperature. The inlet chamber 4 exit is connected to the refining chamber 6 entrance. The refining chamber 6 is equipped with a vacuum forming device located in the cavity above a melt /not shown/. The vacuum forming device in the cavity of the refining chamber 6 above a melt is in the form of a rotary mechanical pump with oil seal VH-1MG [Lozinsky M. G. Materials Thermal Microscopy.—M.: Metallurgy.-1976.—pp. 30-67] connected to the upper part of the refining chamber 6 cavity. The refining chamber 6 is equipped with a vertical baffle 9 intended for forming a melt strip of required thickness on its upper end. The baffle 9 is assembled of coaxially mounted rings. Depending on viscosity of the melt, it is height-adjustable. The melt level in the refining chamber 6 is above the level in the inlet chamber 5 and feeder 10. The refining chamber 6 is connected to the bushing 10. The installation is equipped with four transfer chambers 11, 12, 13, 14. A weir 15 is mounted between the feeder 10 and homogenizer 5. The feeder 10 has outlets to each transfer chamber 11, 12, 13, 14. Each transfer chamber 11, 12, 13, 14 is equipped with a discharge orifice 16 and a heated flow device with bushings 17 below the discharge orifice 16. Transfer chambers 11, 12, 13, 14 are intended for forming a thin-layer melt flow. Each transfer chamber 11, 12, 13, 14 is equipped with a heater 18. The bottom of the transfer chambers 11, 12, 13, 14 is sloped downward in the direction of the discharge orifice 16. A slope angle value for each chamber 11, 12, 13, or 14 is determined experimentally based on production conditions of this or that type of fibers or products. The transfer chambers 11, 12, 13, 14 have different capacities. Thus, each chamber yields a required volume from 1 ton to 1000 tons of fibers per year and may operate independently. At the entrance to each transfer chamber 11, 12, 13, or 14 a weir 15, or 19 respectively is mounted, with an adjustable deflector above it. They are intended for producing a melt of required thickness and quality. Each adjustable deflector 20 is in the form of a guillotine whose cutting edge is horizontal and allows complete melt cutoff from transfer chamber 11, 12, 13, or 14. Each adjustable deflector 20 is mounted so that its profile plane comes into contact with the side surface of the weir 15, 19 when the entrance to each chamber 11, 12, 13, 14 is cut off.

The bottom of the inlet chamber 4, refining chamber 6 and feeder 10 is lined with refractory and conducting materials of a heat-resistant alloy or silicon carbide. Each feeder 10 channel is heated by means of air-gas burner 21 flames.

Each transfer chamber 11, 12, 13, 14 is equipped with an air-gas burner 21.

Below the discharge orifice 16 a bushing assembly 17 is mounted. It is intended for drawing fibers 22. To process fibers 22 with a sizing agent, the installation is equipped with a container for a sizing agent (not shown) delivered to a sizing device 23.

EXAMPLE 1

The Following Types of Sand are Applied as Rock for Obtaining Continuous Fibers Bezmeinskoe deposit, Karakum desert, Turkmenistan,
Maryiskoe deposit, Karakum desert, Turkmenistan,
grandiorites from the Korfovskoe deposit (Khabarovsky region, Russia).

In terms of sand properties and distinctive features, a number of tests have been conducted to determine their structure, grain shape and sort, and material composition.

The sand structure was probed microscopically in artificial transparent sections along with mechanical (grain-size) analysis and total carbonate content analysis. For this purpose Sabanin's method that is widely applicable in geology along with sieve analysis were used.

To determine the total carbonate content and grain-size composition, a 100 g sand charge was placed in a 500 ml cylindrical glass container, then 10% hydrochloric acid was added, stirred with a glass rod and left for one or more days in order for carbonates to fully dissolve, which was determined visually. More acid was added when necessary. When bubbling had ceased (which indicates total dissolution of carbonates) the acid was drained to the extent possible. Then, in order to flush the acid off and separate clay particles, the sand charge was placed in a porcelain cup 20 cm in diameter and bathed in distilled water until the substance was neutral according to a litmus paper test, rubbed by a wooden tamper with a rubber tip to remove clay particles from the grain surface. Upon stirring and setting-out for 42 seconds suspended particles were drained. The step was repeated until the water was absolutely clear. Thus, the drained water cup had the grain size below 0.05 mm.

The sand fraction was placed on paper and air-dried. Then it was collected from the paper with a brush, weighed and classified with a set of sieves into the following sizes: 1-0.5; 0.5-025; 0.25-0.1; 0.1-0.071 and 0.071-0.05 mm. Then a sieve analysis was conducted on a fraction of particles smaller than 0.05 mm in a 1-liter graduated beaker.

As the result of the mechanical analysis, the sand, aleurite and clay particle content was determined. They were classified into groups or fractions of different grain size. The sand fraction was used to determine a mineral composition in the artificial transparent sections of Canada turpentine.

To separate secondary (rare minerals and impurities) from primary sands—constituting the major portion—particles of fractions 0.25-0.1; 0.1-0.071 and 0.071-0.05 mm were separated with a heavy liquid in a medical centrifuge.

For this purpose, the sand charge of a specific fraction and a heavy liquid (Thoulet's solution—a water solution of mercuric iodide in potassium iodide with the specific gravity of 2.9 g/cm$^3$) were placed in a test tube, leaving it underfilled 1 cm. As a result of rotation in the centrifuge for 6 . . . 8 min, the heavy fraction settled down to the bottom, while the light fraction came to the surface. When the centrifuge had come to a stop, first the light fraction and then the heavy one was carefully drained from the test-tube.

The heavy and light fraction's of particles 0.25 to 0.071 mm in size were examined with a binocular magnifier. Some minerals were analyzed in immersion compounds.

The calculation of grains of each mineral was conducted in percent by volume, later translating the latter into percent by weight by means of the average density values.

For the purpose of sand fraction material composition assessment the mineralogical and petrographic analysis and for the aleurite and clay fraction material composition assessment the X-ray phase analysis were conducted. The chemical analysis was performed in accordance with the procedure conventional to the silicate analysis /Chemical Analysis of Rooks and Minerals, N. P. Popov and I. A. Stolyarova. —M.: "Nedra"—1974/.

The fractionation by the above procedure resulted in the following fractional makeup of the sands (see Table 1).

TABLE 1

Sand Fractional Makeup and Carbonate Content, (wt %)

| Deposit | Fraction, % | | | | | Carbonate content |
|---|---|---|---|---|---|---|
|  | 0.5-0.25 | 0.25-0.1 | 0.1-0.071 | 0.071-0.05 | 0.05-0.01 |  |
| Bezmeinskoe | 1.3 | 39.8 | 31.0 | 10.9 | 2.0 | 14.7 |
| Maryiskoe | 0.78 | 37.1 | 37.3 | 7.9 | 1.4 | 15.6 |
| Korfovskoe | 0.9 | 37.8 | 38.9 | 8.5 | 1.7 | 14.9 |

For the most part (65-75%) the sand consists of grains 0.25-0.071 mm in size. To clay content of the examined sand reaches 1 to 2% by weight. The carbonate content ranges from 11.0 to 15.3%. The mineral composition of the studied sand fractions is shown in Table 2.

TABLE 2

Mineral Composition of Sand from the Karakum Desert and Korfovskoe Deposit

| Fraction, minerals (rocks) | Deposits | | |
|---|---|---|---|
|  | Korfovskoe | Bezmeinskoe | Maryiskoe |
| Light fraction | | | |
| Quartz | 66.16 | 64.85 | 65.72 |
| Feldspars | 6.18 | 3.40 | 7.80 |
| Carbonates | 14.9 | 14.7 | 15.6 |
| Mica | 1.75 | 1.82 | 1.61 |
| Rock fragments | 2.51 | 2.24 | 1.21 |
| Clays | 8.95 | 12.11 | 9.25 |
| Heavy fraction | | | |
| Ferrous titanate | 0.034 | 0.041 | 0.065 |
| Garnet | 0.029 | 0.058 | 0.045 |
| Epidote | 0.048 | 0.039 | 0.055 |
| Disthene | 0.0016 | 0.002 | — |
| Amphibole | 0.028 | 0.018 | 0.038 |
| Magnetite | 0.018 | 0.0021 | 0.0088 |
| Limonite | — | 0.0021 | 0.0077 |
| Zircon | 0.001 | — | — |

According to Table 2, the main rook-forming minerals of the sands from the Karakum desert and Korfovskoe deposit are quartz, feldspars and carbonates.

The quartz group comprises quartz in the form of monocrystals, their fragments and fine-grained aggregates. It also includes grains of silicon crystalline modifications: chalcedony and opal colloid form. Furthermore, the following rocks are included in the group: quartzites, cherry formations and jaspers. Quartz grains are concentrated in bigger fractions and generally 0.05-0.08 to 0.6 mm in size.

The feldspar group includes all types of feldspars, for the most part, slightly modified. They are calcosodic (plagioclases) and potassic. Plagioclases appear in the form of fine grains 0.01-0.03 to 0.08 mm in size, of isometric, subangular, round shape, with more or less evident twin formation.

Rock fragments form relatively large crystals up to 0.5-0.6 mm in size, with distinct twin formations, as well as polymorphic calcite aggregates. The shape of the fragments is rounded, or less frequently subangular, or isometric. The fragments are rather large in size: 0.04-0.05 mm. Some of the fragments are covered in limonite films. Moreover, about 5% of the fragments are aggregates of quartz and feldspar, containing micaceous mineral, epidote, amphibole and chalcedony fragments (up to 1%). Also, a microcline was observed in the form of subangular grains 0.04-0.09 mm in size with more or less evident cross-hatched twinning.

The sands (heavy fraction) contained small amounts of ferrous titanate, garnet, epidote, amphibole, etc. Some sand samples contained white or reddish brown plaster generally in from of columnar structures. Some sections contained isolated grains of mafic minerals (augite, hornblende, tremolite, etc.), Isolated rounded grains of forest green glauconite were contained in the sands of the Maryiskoe deposit.

The clay fraction (0.05-0.01 mm) and fine aleurite fraction (0.071-0.05 mm) were subjected to the X-ray phase analysis (XPA). According to the XPA results, the main rock-forming minerals of the Karakum desert and Karfovskoe deposits are quartz, feldspars, carbonate and clay rocks (Table 3).

TABLE 3

X-ray Phase Analysis Results for Sands from the Karakum Desert and Korfovskoe Deposits

| Mineral | Deposits | | | | | |
|---|---|---|---|---|---|---|
| | Korfovskoe | | Bezmeinskoe | | Maryiskoe | |
| | light fraction | clay fraction | light fraction | clay fraction | light fraction | clay fraction |
| Quartz | + | + | + | + | + | + |
| Feldspar | + | + | + | + | + | + |
| Kaolinite | traces | + | + | + | traces | + |
| Hydrous micas | traces | + | + | + | traces | + |
| Chlorites | traces | traces | traces | traces | traces | traces |
| Amphibole | traces | – | – | – | traces | – |
| Calcite | in the carbonate portion | | | | | |

Table 4 shows the results of the chemical analysis of the sands from the Karakum desert and Korfovskoe deposits. According to the data presented in the table, in terms of chemical composition the sand samples of the deposits in the study differ in aluminum oxide ($Al_2O_3$) and calcium (CaO) content. Their ferrous oxide ($Fe_2O_3$ and FeO) content is almost identical. It is characteristic that the amount of $CO_2$ is increased.

TABLE 4

Chemical Composition of Sands from the Karakum Desert and Korfovskoe Deposits

| Oxides, wt % | Deposits | | |
|---|---|---|---|
| | Korfovskoe | Bezmeinskoe | Maryiskoe |
| $SiO_2$ | 65.31 | 65.15 | 67.79 |
| $TiO_2$ | 0.47 | 0.24 | 0.23 |
| $Al_2O_3$ | 15.02 | 10.01 | 8.71 |
| $Fe_2O_3$ | 1.46 | 1.35 | 1.32 |
| FeO | 2.33 | 1.92 | 1.84 |
| CaO | 3.84 | 7.85 | 7.55 |
| MgO | 1.96 | 1.72 | 2.09 |
| $Na_2O$ | 3.37 | 2.03 | 1.68 |
| $K_2O$ | 3.84 | 1.92 | 1.99 |
| MnO | — | 0.11 | 0.09 |
| $SO_3$ | 0.10 | 0.09 | 0.10 |
| $P_2O_5$ | 0.11 | 0.09 | 0.10 |
| Loss after torrefaction | — | 2.20 | 1.71 |
| $CO_2$ | 3.84 | 4.99 | 5.61 |
| $H_2O$ | 1.11 | 0.12 | 0.19 |

Thus, according to the results of the mineralogical and chemical analysis it is possible to obtain fibers from sand. For this purpose, before charging sand into the furnace 2 it is covered in water, stirred, left for 5-10 minutes. When light impurities appear on the water surface, they are removed and the water is drained.

The procedure of adding water to the sand, stirring, waiting for 5-10 minutes until light impurities form on the water surface, removal of the impurities and water draining must be repeated for 3-5 times. Light impurities in the sand are separated from the same when the water is added and stirred, and come to the water surface subject to the ascending force, where they are removed by draining the upper layer of water containing the light impurities.

Then the sand is dried (not shown) and transported to the batch charger 1 that continuously and evenly distributes the sand across the whole area of the electric resistance furnace 2 at a specified rate and in a "thin layer" making the most of the principal constituent of heating—radiant heat transfer. By the "pile" charging the ratio between the outer surface of the sand batch and its mass surface, i.e. the sum of surfaces of all the batch particles is negligible. Thus, volume charging or melting in "piles" by no means proves its worth.

The study showed that two portions of batch that are different in weight—one is in the form of "a pile" and the other one distributed across the heated surface in a thin layer—reach the free-flowing temperature in 90 minutes and 1-2 minutes respectively. Thus, the distribution of sand across the heated surface in the furnace cavity 2 in a thin layer intensifies the melting process and increases the pull rate of silicate melt, shortens furnace 2 downtimes resulting from warm-up and cool-down in case of stops. Significantly large calorific intensity of the melting furnace 2 enables rock melting with the bottom melt discharge in the form of a continuous stream having a controlled rate, which is enabled by the optimum diameter of the heated drain unit 3. Moreover, the melt residence time in the furnace 2 is also adjustable by changing the elevation of the heated drain unit 3.

Sand is continuously melted in the furnace 2 at the temperature of 1750 . . . 1850° C. The optimum melting temperatures for the above sands are the following:

Bezmeinskoe deposit, Karakum desert, Turkmenistan—1750 . . . 1800° C.,

Maryiskoe deposit, Karakum desert, Turkmenistan—1750 . . . 1780° C., grandiorites from the Korfovskoe deposit (Khabarovsky region, Russia)—1830 . . . 1850° C.

The melt continuously flows from the bottom of the furnace 2 through the heated drain unit 3, then under the influence of gravitation force the melt flows into the inlet chamber 4 of the homogenizer 5, where it is subjected to the flame of the air-gas burners 6, attached in the upper part of the inlet chamber 4 in two rows at the off-vertical angle α=3 . . . 65°, at the distance of H=(5 . . . 7)D from the axis of the homogenizer, where D is a burner nozzle diameter. The burners 6 are staggered. Moreover, the burner angles in opposite rows are inversed. The angle value α=3 . . . 65° is selected for the following reason: with the angle below 3° the melt flow rate increases, however, the burners are worn out faster due to a larger heating surface; when the angle exceeds 65° the melt flow rate decreases along with the degree of its homogenization. Apart from the controlled-angle gas stream action on the surface of the melt, it is important to maintain the burner location distance H=(5 . . . 7)D. When the distance is shorter than 5D it has no significant effect but results in the burner operating life reduction. When the distance exceeds 7D, the effect of melt layer mixing in depth decreases. The claimed values of angle α and distance H have been determined experimentally and are optimum values for attainment of the technical result—intensification of the melt homogenization process. Moreover, the burners are attached in two rows, with the opposite row burner angles inversed. As a result, the melt is subjected to two streams in opposite directions, which significantly intensifies melt homogenization, and maintains the operating temperature in the homogenizer. At the same time, upper melt layers are mixed by means of the flame from the air-gas burners 7 attached at inversed angles in each other's direction. The mixing of the melt in the central and bottom parts of the inlet chamber 4 is achieved by means of side (not shown) and bottom 8 bubbling nozzles intended for heated air supply. Due to limited residence time of the melt in the inlet chamber 4 of the homogenizer 5 the melt becomes quite gaseous, turbulent, relatively unrefined, and generally unsuitable for filamentation due to the presence of unreacted raw batch, bubbles, etc., all of which make continuous, efficient filamentation impossible. To clarify the melt it is fed under gravity to the refining chamber 6 where the air pressure in the decompression zone above the melt is maintained within the range of 0.10 . . . 0.30 Pa with a vacuum pump /not shown/, with unreacted chemical elements vaporizing. The refining chamber 6 is equipped with a baffle 9. Under decompression the melt flows over the baffle 9 forming on its upper end a thin layer that is freed from gas bubbles and unreacted particles and thus refined. From the refining chamber 6 the melt flows down the descending channel and over a weir 15 into a feeder 10 where owing to small thickness of the melt flow uncontrolled convective flows and related heat loss are avoided.

The furnace 2 has small dimensions. As a result, it is easy to keep heating parameters under close control. The efficiency of the furnace 2 exceeds 65%, and compared to a glass-melting tank the melt residence time in the same 2 is reduced by the factor of 50.

At the top, the feeder 10 is heated by the flames of burning gas from the air-gas burners 21 and electric heaters 18 that along with a precision temperature controller (not shown) and temperature sensors—platinum/platinum-rhodium thermocouples (not shown)—maintain the melt temperature in the feeder with the accuracy off 0.5° C. Then the melt passes through the weir 19 and adjustable deflector 20 mounted at the passage from the feeder 10 to the transfer chamber 11, through the discharge orifice 16 to the bushing assembly 17.

The transfer chamber 11 heating maintains the achieved melt homogenization level, resulting in strong fine fibers. The heated melt is passed to the bushing assembly 17 where continuous fibers 22 are drawn. The fibers 22 are coated with a sizing, agent supplied from the container with a sizing device 23. Upon the sizing procedure the fibers 22 are fed by means of a gear system to the winder assembly 28 where they are wound on a bobbin to later be processed into respective products.

As a result, high silicate continuous fibers were obtained from the above sands. Their properties are shown in Table 5. The continuous elementary fiber strength was measured with a dynamometer, with the gage length of 10 mm, while the coarse fiber strength was measured with a tensile-testing machine PM-3, with the gage length of 50 mm.

TABLE 5

Tensile Strength of Fibers Produced of Sandy Rocks

| Deposits | Diameter, μm | Tensile strength, MPa |
|---|---|---|
| Bezmeinskoe | 9.0 | 2090 |
| Maryiskoe | 11.1 | 1990 |
| Korfovskoe | 10.1 | 2010 |
| Basalt (prototype) | 9.5 | 1800 |

High silicate chopped fibers produced of the above sands were obtained from the melt passed through the transfer chamber 12. Melt streams were formed by a slot-type 2000-bushing assembly, from where continuous fibers were fed to a chopping machine 25.

The parameters of high silicate chopped fibers produced of the above sands are shown in Table 6.

TABLE 6

| Parameter | Bezmeinskoe deposit | Maryiskoe deposit | Korfovskoe deposit | Basalt (prototype) |
|---|---|---|---|---|
| Length, mm | 6.0 | 6.2 | 6.0 | 6.1 |
| Fiber diameter, μm | 11.2 | 10.9 | 10.1 | 9.9 |
| Not chopped fibers, not exceeding, % | 3.0 | 3.0 | 3.2 | 3.5 |

High silicate coarse fibers produced of the above sands were obtained from the melt passed through the transfer chamber 13. Melt streams were formed by a slot-type 600-bushing assembly manufactured of a refractory alloy. Melt streams were drawn mechanically with the rate of 5 . . . 10 m/min. Formed coarse fibers were chopped into lengths with a coarse fiber chopping device 26. The main parameters of high silicate coarse fibers are shown in Tables 7 and 8.

TABLE 7

| Deposits | Diameter, μm | Tensile strength, kg/mm$^2$ |
|---|---|---|
| Bezmeinskoe | 155.3 | 22.9 |
| Maryiskoe | 160.3 | 23.1 |
| Korfovskoe | 157.4 | 22.8 |
| Basalt (prototype) | 155.5 | 22.0 |

TABLE 8

Chemical Stability of High Silicate Coarse Fibers

| Deposits | Diameter, μm | Media resistance, % | | | |
|---|---|---|---|---|---|
| | | H₂O | 0.5 N NaOH | 2.0 N NaOH | 2 N HCL |
| Bezmeinskoe | 160.5 | 99.5 | 99.3 | 98.9 | 99.5 |
| Maryiskoe | 165.5 | 99.6 | 99.4 | 98.9 | 99.7 |
| Korfovskoe | 163.4 | 99.4 | 99.2 | 98.4 | 99.4 |
| Basalt (prototype) | 159.5 | 99.3 | 99.1 | 98.0 | 99.1 |

High silicate staple fibers produced of the above sands were obtained from the melt passed through the transfer chamber 14 by blasting primary fibers with hot gases following an established method /see Kitaygorodsky N. I. Glass Technology. M.: Gosstroyizdat, 1961. 624 pp./. The properties of the obtained high silicate staple fibers are shown in Table 9.

TABLE 9

| Deposits | Diameter, μm | Media resistance, % | | | |
|---|---|---|---|---|---|
| | | H₂O | 0.5 N NaOH | 2.0 N NaOH | 2 N HCL |
| Bezmeinskoe | 0.85 | 94.5 | 83.0 | 79.0 | 80.0 |
| Maryiskoe | 0.83 | 94.6 | 82.6 | 78.8 | 80.5 |
| Korfovskoe | 0.82 | 94.4 | 82.9 | 78.9 | 80.5 |
| Basalt (prototype) | 0.72 | 94.0 | 52.8 | 15.4 | 27.5 |

According to the results of the study, high silicate continuous fibers, high silicate chopped fibers, high silicate coarse fibers and high silicate staple fibers produced of the above sands are superior to basalts in terms of chemical stability.

EXAMPLE 2

Rocks: quartz sand of the Kriushinskoe deposit, Chuvash Republic, Russia and quartz sand of the Skugareevskoe deposit, Ulyanovskaya region, Russia. The chemical analysis of the above rocks is shown in Table 10. The silicon oxide content in the same is equal to or exceeds 96%. The above rocks were clarified by means of water flushing, dried and fed to the batch charger 1, then to the furnace 2, and then the procedure was identical to that in Example 1.

TABLE 10

Chemical Composition of Sands from the Kriushenskoe and Skugareevskoe Deposits

| Oxides, wt % | Deposits | |
|---|---|---|
| | Kriushenskoe | Skugareevskoe |
| $SiO_2$ | 98.05 | 97.9-99.2 |
| $TiO_2$ | 0.019 | 0.02-0.09 |
| $Al_2O_3$ | 0.35 | 0.25-0.6 |
| $Fe_2O_3$ | 0.39 | 0.03-0.25 |
| CaO | 0.35 | 0.05-0.11 |
| MgO | 0.5 | 0.05-0.19 |
| $Na_2O$ | 0.4 | 0.05 |
| $K_2O$ | | 0.04-0.08 |
| $SO_3$ | 0.042 | 0.03-0.06 |
| Loss after torrefaction | 0.15 | 0.05-0.18 |

As a result of the suggested method, high silicate continuous fibers were produced. Strength of the obtained high silicate continuous fibers is shown in Table 11.

TABLE 11

| Deposits | Diameter, μm | Tensile strength, MPa |
|---|---|---|
| Kriushinskoe | 10.2 | 2360 |
| Skugareevskoe | 11.1 | 2405 |

As a result of the suggested method, high silicate chopped fibers were produced, with the parameters shown in Table 12.

TABLE 12

| Parameter | Kriushinskoe deposit | Skugareevskoe deposit |
|---|---|---|
| Length, mm | 6.0 | 6.2 |
| Fiber diameter, μm | 10.9 | 11.3 |
| Not chopped fibers, not exceeding, % | 3.2 | 3.3 |

As a result of the suggested method, high silicate coarse fibers were produced, with the strength parameter shown in Table 13.

TABLE 13

| Deposits | Diameter, μm | Tensile strength, kg/mm² |
|---|---|---|
| Kriushinskoe | 150.5 | 25.0 |
| Skugareevskoe | 160.1 | 28.0 |
| Basalt (prototype) | 155.5 | 22.0 |

As a result of the suggested method, high silicate staple fibers were produced, with the chemical properties shown in Table 14.

TABLE 14

| Deposits | Diameter, μm | Media resistance, % | | | |
|---|---|---|---|---|---|
| | | H₂O | 0.5 N NaOH | 2.0 N NaOH | 2 N HCL |
| Kriushinskoe | 0.84 | 95.4 | 88.4 | 84.2 | 85.2 |
| Skugareevskoe | 0.85 | 95.8 | 89.1 | 84.8 | 85.9 |

EXAMPLE 3

Rocks: Reduced Quartz Sandstone of the Cheremshanskoe Deposit, Buryatia, Russia, Whose Chemical Composition is Shown in Table 15

TABLE 15

Chemical Composition of the Quartz Sandstone from the Cheremshanskoe Deposit and Quartzites from the Ovruchskoe Deposit

| Oxides, wt % | Cheremshanskoe deposit | Ovruchskoe deposit |
|---|---|---|
| $SiO_2$ | 99.2 | 97.9 |
| $TiO_2$ | 0.024 | 0.14 |
| $Al_2O_3$ | 0.43 | 1.55 |
| $Fe_2O_3$ | 0.133 | 0.43 |
| CaO | 0.08 | 0.10 |

TABLE 15-continued

Chemical Composition of the Quartz Sandstone
from the Cheremshanskoe Deposit and Quartzites
from the Ovruchskoe Deposit

| Oxides, wt % | Cheremshanskoe deposit | Ovruchskoe deposit |
|---|---|---|
| MgO | 0.02 | — |
| $Na_2O$ | 0.02 | 0.07 |
| $K_2O$ | 0.083 | — |
| MnO | — | 0.2 |
| $P_2O_5$ | — | 0.02 |

The above rocks were clarified by means of water flushing, dried and fed to the batch charger 1, then to the furnace 2, and then the procedure was identical to that in Example 1.

As a result, high silicate continuous fibers, high silicate chopped fibers, high silicate coarse fibers and high silicate staple fibers were discharged from the bushing assemblies 17 of transfer chambers 11, 12, 13, and 14 respectively. The chemical properties of the staple fibers are shown in Table 16.

TABLE 16

| Deposit | Diameter, μm | Media resistance, % | | | |
|---|---|---|---|---|---|
| | | $H_2O$ | 0.5 N NaOH | 2.0 N NaOH | 2 N HCL |
| Cheremshanskoe | 0.87 | 96.2 | 90.8 | 85.7 | 87.6 |
| Ovruchskoe | 0.85 | 94.8 | 88.3 | 83.2 | 84.5 |

EXAMPLE 4

Rocks: Reduced Quartzites of the Ovruchskoe Deposit, Ukraine, Whose Chemical Composition is Shown in Table 15

The above rocks were clarified by means of water flushing, dried and fed to the batch charger 1, then to the furnace 2, and then the procedure was identical to that in Example 1.

As a result, high silicate continuous fibers, high silicate chopped fibers, high silicate coarse fibers and high silicate staple fibers were discharged from the bushing assemblies 17 of transfer chambers 11, 12, 13, and 14 respectively. The chemical properties of the staple fibers are shown in Table 16.

Thus, in consideration of raw material nondeficiency and high physicochemical parameters that are superior to those of basalts, high silicate continuous, chopped, coarse and staple fibers will find application in numerous industries, in particular in terms of their application in aggressive environments.

The invention claimed is:

1. A method of production of high silicate fibers of rocks comprising the operations of rock charging into a melting furnace, melting, melt homogenization and stabilization, drawing fibers from the melt discharged from the discharge orifice bushing, characterized in that silicon-based rocks are used as raw materials, when the melt is formed from the same, the melt temperature is brought to 1750 to 1850° C., and after melt homogenization and stabilization the decompression zone is formed on the path of the melt flow to the discharge orifice bushing at the specified temperature, the melt flow in the decompression zone is shaped into a strip 3.0 to 20.0 mm thick and passed through the zone with the rate of $V=(7)10^{-4}$ m/s to $(9)10^{-4}$ m/s, and the air pressure above the flow in the decompression zone is maintained within the range of 0.10 to 0.30 Pa.

2. A method as defined in claim 1, characterized in that sand is used as a raw material.

3. A method as defined in claim 1, characterized in that quartz sand is used as a raw material.

4. A method as defined in claim 1, characterized in that crushed sandstone or quartzites are used as raw materials.

* * * * *